(12) United States Patent
Grimshaw et al.

(10) Patent No.: US 6,745,454 B1
(45) Date of Patent: Jun. 8, 2004

(54) FLEXIBLE MANUFACTURING AND WORKPIECE TRANSFER SYSTEM

(75) Inventors: Jeffrey Boyd Grimshaw, Montague, MI (US); Aaron Thomas Russick, Charlotte, NC (US); Daniel D. Minor, Cadillac, MI (US); Tom Duane Rabe, Montague, MI (US); John Richard Snyder, New Era, MI (US); Larry Richard Erdman, Montague, MI (US); Steven Mark Sunday, Rothbury, MI (US); Tracy William Erickson, Muskegon, MI (US); Steven Ronald Erdman, Montague, MI (US); Gary David Mason, Whitehall, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/061,009

(22) Filed: Jan. 30, 2002

(51) Int. Cl.[7] ............................................... B23Q 41/00
(52) U.S. Cl. ........................... 29/563; 29/564; 29/33 P; 198/346.1; 198/346.3
(58) Field of Search ........................ 29/563, 564, 33 P; 198/346.1, 346.3; 483/14, 15

(56) References Cited

U.S. PATENT DOCUMENTS

| | | | | |
|---|---|---|---|---|
| 3,313,014 A | * | 4/1967 | Lemelson .................. 29/33 P |
| 3,576,540 A | * | 4/1971 | Fair et al. .................. 29/563 |
| 3,854,889 A | * | 12/1974 | Lemelson .................. 29/33 P |
| 4,679,297 A | * | 7/1987 | Hansen, Jr. et al. ........ 414/806 |
| 4,706,371 A | * | 11/1987 | McMurtry .................... 483/14 |
| 5,081,889 A | * | 1/1992 | Takano et al. ................ 82/122 |
| 5,100,284 A | * | 3/1992 | Boisseau ................ 414/744.3 |
| 5,125,149 A | | 6/1992 | Inaba et al. |
| 5,220,718 A | | 6/1993 | Speller, Sr. et al. |
| 5,321,874 A | * | 6/1994 | Mills et al. ................. 29/33 P |
| 5,379,510 A | * | 1/1995 | Berge .......................... 29/564 |
| 5,407,415 A | * | 4/1995 | Spishak ........................ 483/4 |
| 5,493,767 A | | 2/1996 | Susnjara |
| 5,781,983 A | * | 7/1998 | Gruner ........................ 29/563 |
| 5,920,974 A | * | 7/1999 | Bullen ....................... 29/33 K |
| 6,394,740 B1 | * | 5/2002 | Derby et al. ............. 414/744.1 |
| 2001/0054535 A1 | * | 12/2001 | Faitel ...................... 198/346.3 |

OTHER PUBLICATIONS

Grudel, Aug. 2002, www.gudel.com, robotics brochure, roboloop pp. 30–42.*

* cited by examiner

*Primary Examiner*—A. L. Wellington
*Assistant Examiner*—Dana Ross
(74) *Attorney, Agent, or Firm*—MacMillan, Sobanski & Todd, LLC (57) ABSTRACT

A flexible manufacturing line and manufacturing process employs an overhead gantry system to transfer fixtured workpieces between machining stations served by the gantry system. The machining stations include CNC machines, turret cells, and/or dedicated machines which receive the fixtured workpieces through top-entry openings. The invention provides flexibility and adaptability to variation, improved maintenance of reference position on the fixture during manufacture, improved accessibility to machining stations during operation, and increased safety.

11 Claims, 9 Drawing Sheets

FLEXIBLE MANUFACTURING AND WORKPIECE TRANSFER SYSTEM

BACKGROUND OF THE INVENTION

The present invention relates in general to subjecting a workpiece to a series of manufacturing operations, and, more specifically, to the machining of parts or workpieces by a plurality of machining stations using fixtures transported by a gantry system.

In the manufacturing of certain cast metal products, it is not possible to achieve the final part shape and tolerances by casting alone. Part manufacture usually includes several machining operations that must be applied to the original casting, such as drilling, boring, milling, cutting, and tapping. Products of this type include engine manifolds, wheels, brake rotors, and suspension components such as steering knuckles, control arms, and cross members.

In mass production, it is necessary to organize a manufacturing process with high reliability, short cycle times, easy maintenance, and worker safety while minimizing cost and space requirements. It is also highly desirable to achieve flexibility of the manufacturing process and the manufacturing equipment so that the process and equipment can be adapted at low cost to changes in part design, part mix, or part quantities.

Manufacturing systems utilizing automation are preferred because of increased consistency and reduced time and cost. Automated machining stations typically receive a workpiece (e.g., an unfinished casting) mounted on a fixture (also called a pallet) and automatically perform the desired machining operations on the workpiece. The workpieces may be delivered to and removed from the machining station either manually or automatically by a conveyance.

Various types of machining stations are known. Dedicated stations are constructed to perform a fixed set of operations and cannot be easily adapted to perform other tasks. Dedicated stations usually have a cost advantage when a large volume of parts is to be made and no significant design changes are to occur during a long production run. Another type of station is the computer-numerically-controlled (CNC) machine, which is programmable to perform a variety of machining operations and has advantages of being able to produce parts with a lower number of machining stations and therefore requiring less relocation of a workpiece during manufacture. In addition, CNC machines are more easily adapted to new products or processes and can reduce overall capital investment for a changeover. A typical CNC machine has programmable multidimensional movement of both the tool head and the table that receives the fixture and workpiece.

An especially adaptable type of CNC machine is the flex turret cell which employs a multi-spindle head that automatically reconfigures itself to use selected ones of several tools contained on the multi-spindle head. The multi-spindle head usually comprises a gearbox with multiple output shafts (a different tool on each shaft) driven by a common input shaft. The head is indexed between separate operations while a workpieces remains at the machining station, which improves cycle time and accuracy.

Nevertheless, previous automated systems have suffered from various drawbacks. For example, transfer of workpieces between work stations has remained labor intensive, slow, and/or inflexible (i.e., not easily adaptable to process changes or substitutions). A single workpiece may need to be swapped between various fixtures corresponding to different machining stations when the particular set of machining operations to be performed on the workpiece occurs at several different machining stations. Overall accuracy suffers due to a loss of an exact registration in a reference position between fixtures. Another disadvantage has been the inaccessibility of the CNC machines during operation, making observation and maintenance more difficult.

These disadvantages are overcome by the present invention.

SUMMARY OF THE INVENTION

It is an object and advantage of the present invention to provide a flexible manufacturing line and manufacturing process providing flexibility and adaptability to variation, improved maintenance of reference position on the fixture during manufacture, improved accessibility to machining stations during operation, and increased safety.

In one aspect, the present invention provides apparatus of applying a series of machining operations to a workpiece. The apparatus comprises an operator station for affixing workpieces to respective fixtures, the fixtures registering and retaining the workpieces during the series of machining operations. There are a plurality of machining stations, each machining station being configured to receive the fixtures and performing respective machining operations. A gantry system includes a plurality of movable carriages running proximate to the machining stations and the operator station. The gantry system receives the fixtures for conveyance between and among the operator station and the machining stations. A main controller communicates with the operator station, the plurality of machining stations, and the gantry system. The main controller monitors status of the workpiece and is programmed with a sequence for applying predetermined ones of the machining operations to the workpiece. The main controller commands the gantry system to convey the fixture to at least one of the machining stations, commands the one machining station to perform a selected one of the machining operations, and commands the gantry system to return the fixture to the operator station.

DETAILED DESCRIPTION OF PREFERRED EMBODIMENTS

Figure 1:
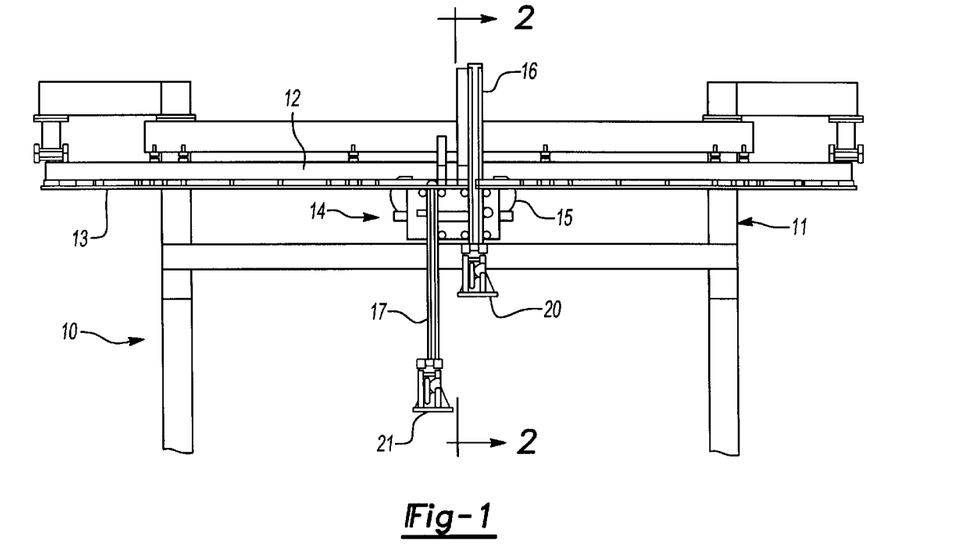
FIG. 1 is a front, plan view of a gantry system used in a preferred embodiment.
Figure 2:
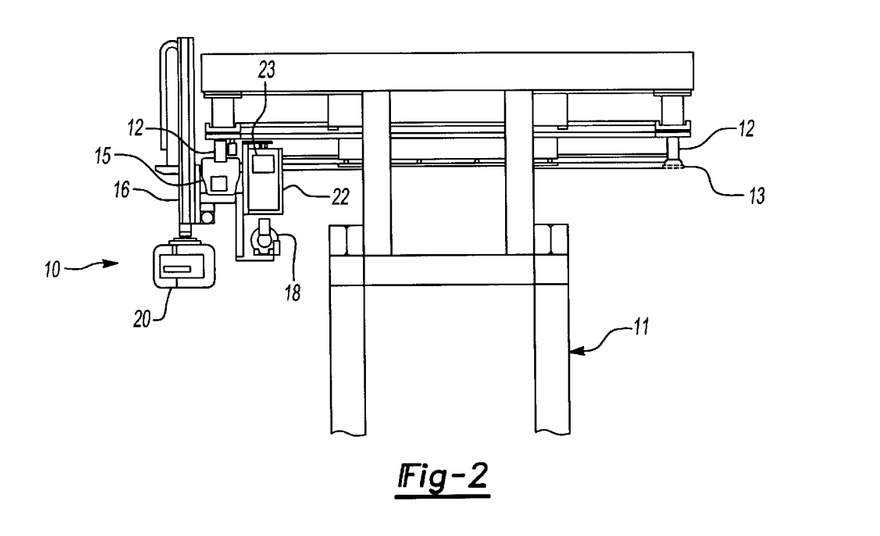
FIG. 2 is a side, plan view of the gantry system of FIG. 1.

Referring to FIGS. 1 and 2, a gantry system 10 is used in the present invention to transfer fixtures and the workpieces mounted thereon between machining stations. Preferably, gantry system 10 is constructed to primarily convey the fixtures and workpieces in an overhead manner. Gantry system 10 may for example be comprised of a roboLoop system sold by Güdel AG of Langenthal, Switzerland. The roboLoop system is a gantry, transfer, and carrier system that may be laid out with straight lines and curves. It is modular so that sections can be easily added or removed when expanding or reconfiguring a manufacturing operation based on changed needs.

Gantry system 10 includes a support structure 11 which employs a free-standing I-beam frame to locate a mounting beam 12 in a desired overhead position. Mounting beam 12 could alternatively be ceiling mounted. A guideway and rack 13 is suspended from mounting beam 12 and receives at least one carriage 14. In a preferred embodiment, guideway and rack 13 forms a continuous loop and a plurality of carriages 14 are provided.

Carriage 14 includes a carrier 15 having rollers engaged with guideway and rack 13 for movement along the loop. A rack-and-pinion encoder in carrier 15 engages guideway and rack 13 so that carriage 14 can determine its exact location at all times. Carrier 15 supports and controls a pair of "H" arms 16 and 17. A servomotor 18 provides a linear axis drive to create motion in three axes (x, y, and z dimensions). Arms 16 and 17 have end-of-arm clamps 20 and 21, respectively, with each containing a servo-controlled mechanism for grasping fixtures. "H" arms 16 and 17 may have a lifting capacity of about 120 kilograms, for example.

Carriage 14 also includes a carriage controller 22 which stores and implements all commands necessary to perform each of its assigned tasks, such as presenting a fixture to a particular machining station, removing a fixture from a particular machining station, conveying a fixture between machining stations, etc. Carriage controller 22 includes an RF transceiver 23 for communicating with a main system controller located remotely from gantry system 10. RF communication includes sending positional and status information from carriage controller 22 to the main controller and sending task commands from the main controller to carriage controller 22.

Gantry system 10 also includes an insulated conductor rail (not shown) for distributing electrical power to carriage 14 via a current collector (not shown). Other rails such as the guideway or mounting beam can be used to provide a ground return for the electric power.

Figure 3:
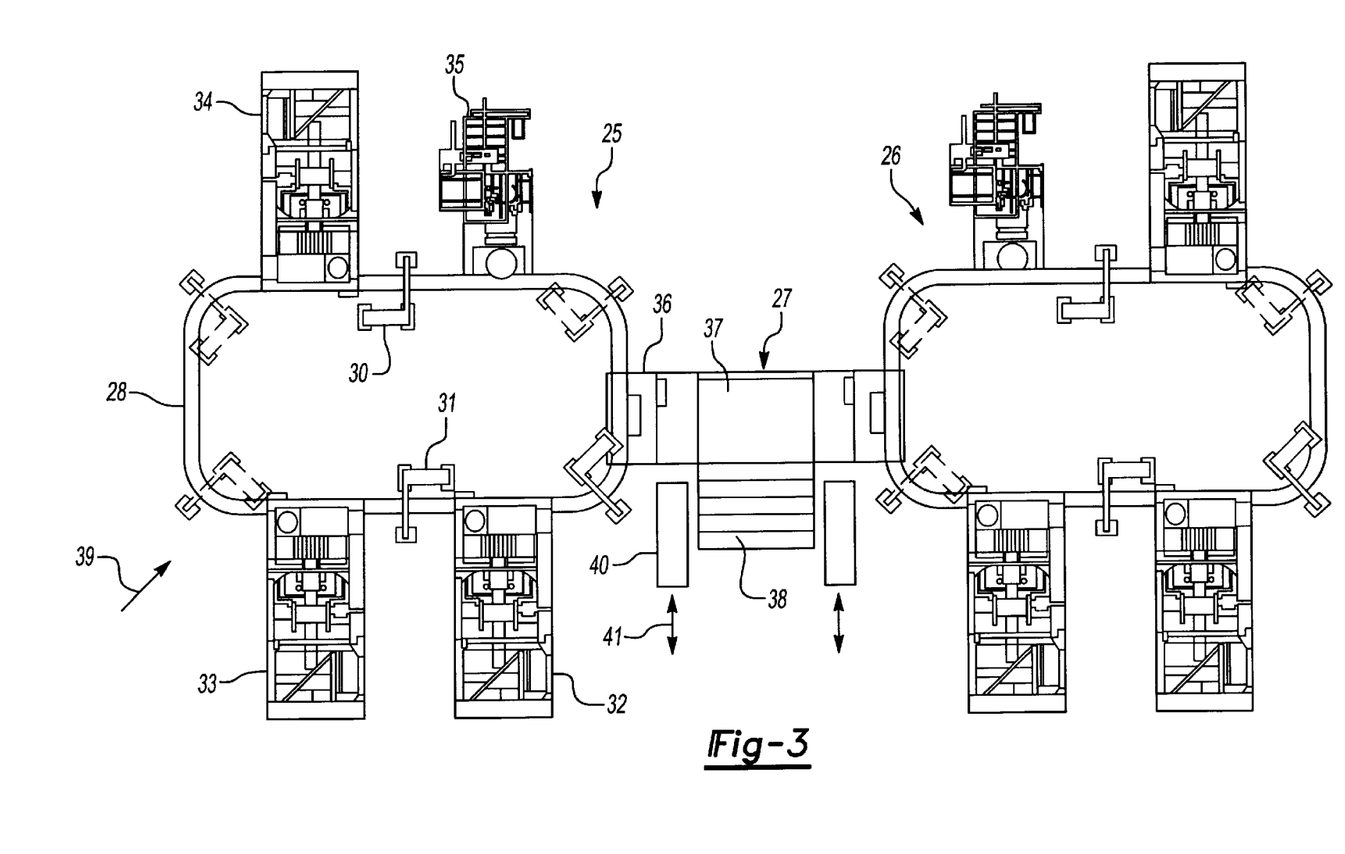
FIG. 3 is an aerial layout view of a manufacturing line according to the present invention and using a monorail loop.

FIG. 3 shows two complete manufacturing loops according to the invention. A first manufacturing loop 25 is arranged to perform a sequence of predetermined machining operations in order to manufacture a workpiece into a desired product. A second manufacturing loop 26 is deployed adjacent to loop 25, there being an operator station 27 disposed between the two loops. Loops 25 and 26 are shown as being substantially identical and could be used to manufacture identical products; however, the loops could also manufacture completely different products using similar or very different machining stations. Furthermore, each loop could be designed to manufacture more than one particular product simultaneously. Due to the similarities of loops 25 and 26, only loop 25 will be described in further detail.

Loop 25 includes a monorail 28 with a mounting beam, guideway and rack, and provision for electric power as discussed with reference to FIGS. 1 and 2. A pair of carriages 30 and 31 are mounted to monorail 28 for movement around the loop to operator station 27, CNC machines 32, 33, and 34, and a flex turret cell 35. Operator station 27 includes a loading/unloading bay 36 located proximate to monorail loop 28 where an operator loads and unloads workpieces on and off of fixtures that are delivered to bay 36 by carriages 30 and 31. Operator station 27 may also include a central platform 37 and stairway 38 for easy operator access to the bays and to a part delivery and removal system 40 which may include a conveyor system, overhead wire transfer, fork lifts, etc. Unfinished workpieces are delivered to and finished workpieces removed from operator station 27 as shown by arrow 41.

In a preferred embodiment, the layout of FIG. 3 employs a predetermined fixture design for carrying workpieces and a corresponding fixture-holder design in each machining station (i.e., CNC machines 32–34 and flex turret cell 35) so that each single workpiece remains affixed to the same fixture throughout the entire sequence of machining operations. Thus, a workpiece is loaded onto a fixture at bay 36 and automatically proceeds to the appropriate machining stations to accomplish the desired machining operations for the particular workpiece and is then automatically returned to bay 36 for removal from the fixture by the operator.

Figure 4:
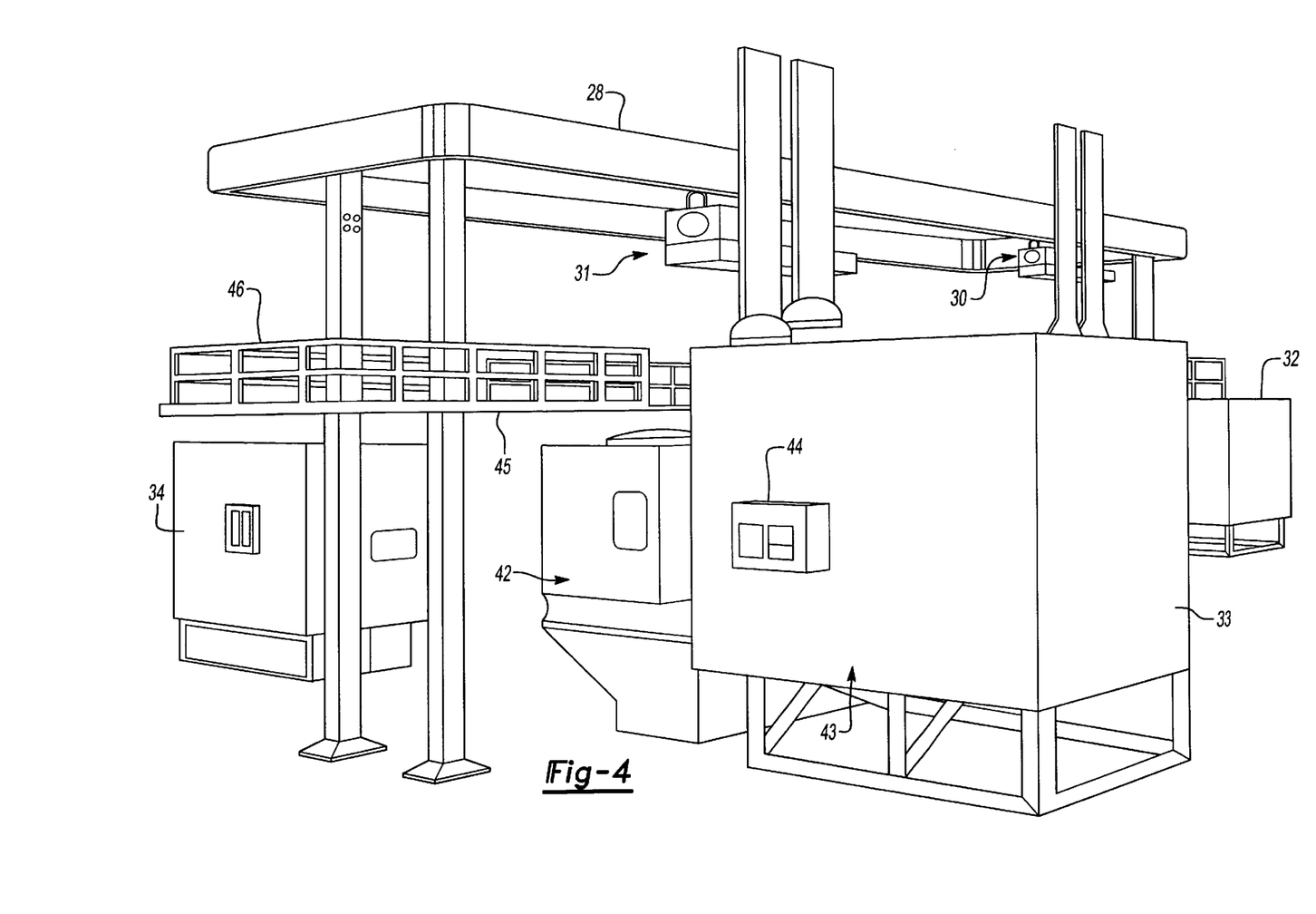
FIG. 4 is a perspective view of a portion of the manufacturing line of FIG. 3.

FIG. 4 is a perspective view along the sight line indicated by arrow 39 in FIG. 3. CNC machine 33 includes a table portion 42 and a tool portion 43. Table portion 42 is proximate to (e.g., beneath) the gantry system and has a top entry opening to receive fixtures from carriages 30 and 31. Fixtures a vertically delivered to a removed from a fixture table within the side enclosure walls of table portion 42. Tool portion 43 contains any conventional type of CNC machine. Control box 44 includes a microcontroller for controlling all actions of table portion 42 and tool portion 43 and for communicating (e.g., receiving commands and sending status information) with a main controller by direct wiring (not shown).

A preferred embodiment of the present invention employs a raised platform 45, preferably at about the height of the top entry openings of the machining stations (e.g., about 8 feet). Platform 45 increases the safety of persons moving about in the corresponding floor area and facilitates maintenance by allowing 360° access around all machines, even during normal production operation. A guard rail 46 may also be provided at the periphery of platform 45 to form a barrier around the area where the fixtures are conveyed between machining stations. As a consequence of these self-contained guarding features, the present invention can avoid the cost, loss of floor space, and inconvenience of perimeter fencing that is required by typical robotic cells.

Figure 5:
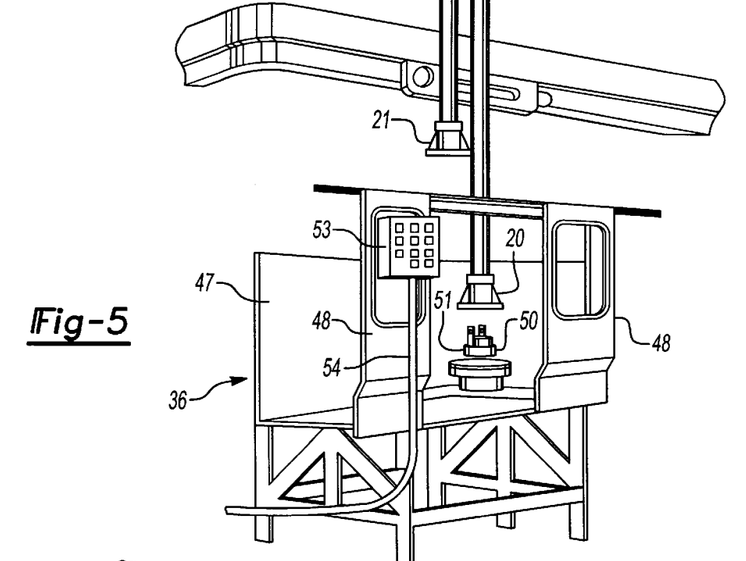
FIG. 5 is a perspective view of a portion of the operator station of FIG. 3.

Loading/unloading bay 36 of the operator station is shown in greater detail in FIG. 5 with the operator platform removed. An enclosure 47 has front sliding doors 48 through which an operator loads and unloads workpieces. A fixture holder 50 securably receives a fixture 51 during the loading or unloading of a workpiece. End-of-arm clamp 20 is shown released from fixture 51 although it would preferably remain connected during the unloading/loading of workpieces. Depending upon the particular manufacturing process being implemented, end-of-arm clamp 21 may remain empty at the operator station so that it can first retrieve a fixture at the first machining station in sequence.

Loading/unloading bay 36 includes a control box 53 connected to a main controller via a wiring conduit 54. Control box 53 provides an interface between a human operator and the main controller allowing the operator to send status information and operational requests or commands.

Figure 6:
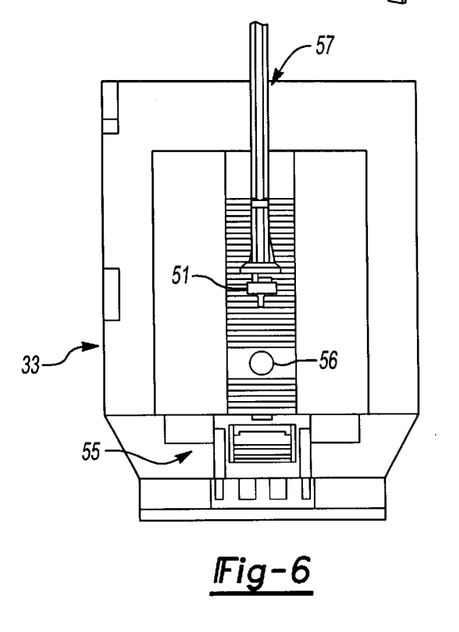
FIG. 6 is a front view of a CNC machine of the present invention with a front guard panel removed.
Figure 7:
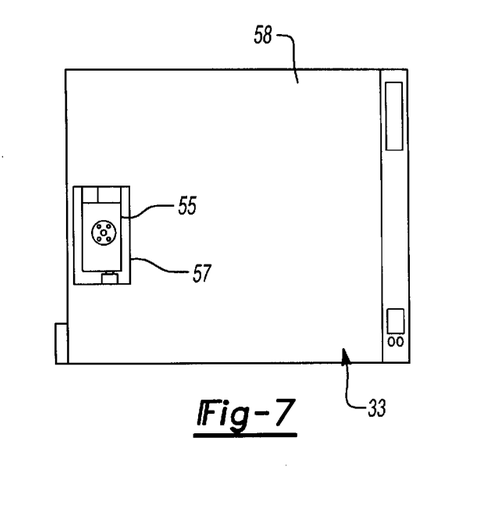
FIG. 7 is a top view of the CNC machine of FIG. 6.
Figure 8:
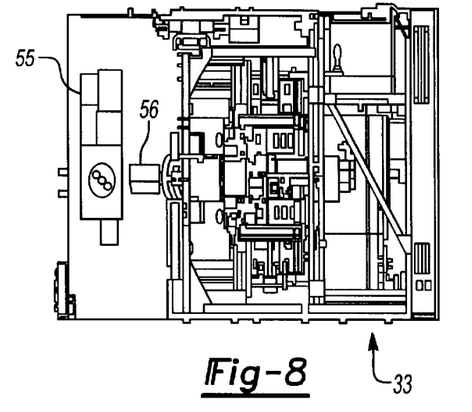
FIG. 8 is a top view of the CNC machine of FIG. 6 with a top panel removed.

CNC machine 33 is shown in greater detail in FIGS. 6–8. FIG. 6 is a front, partially cutaway view revealing a fixture table 55 with means for securably receiving fixture 51. Once secured, fixture 51 is manipulated into a desired position for machining by automatic slewing of table 55. A CNC tool 56 then performs a commanded machining operation on a workpiece secured to fixture 51. A top entry opening 57 permits vertical access to table 55 by the gantry arm. FIG. 7 is a top view showing top entry opening 57 cut within a machine top plate 58. FIG. 8 is a top view with top plate 58 removed.

Figure 9:
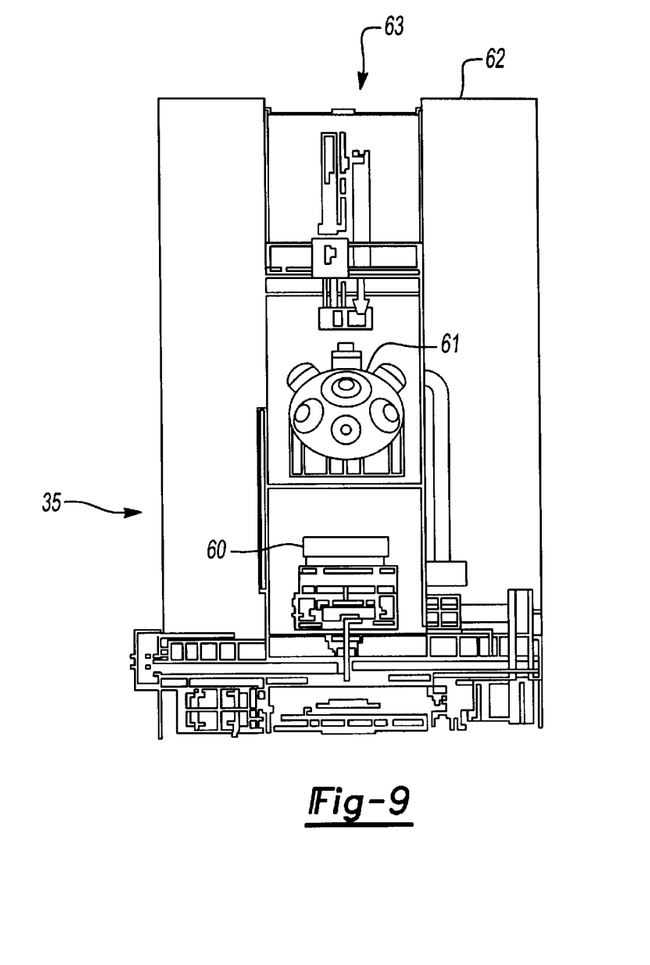
FIG. 9 is a front view of a flex turret machine used in a preferred embodiment.

Flex turret cell 35 is shown in greater detail by the front, partially cutaway view of FIG. 9. Cell 35 includes a fixture table 60 for receiving fixtures and presenting them to an indexing turret 61. Turret 61 preferable comprises a multi-faceted spindle nose wherein indexing of the spindle allows several different tools to be utilized on a workpiece without removal or reacquisition of a reference data point. Cell 35 has a top plate 62 with a top entry opening 63 for vertically receiving fixtures carried by the gantry arms.

Figure 10:
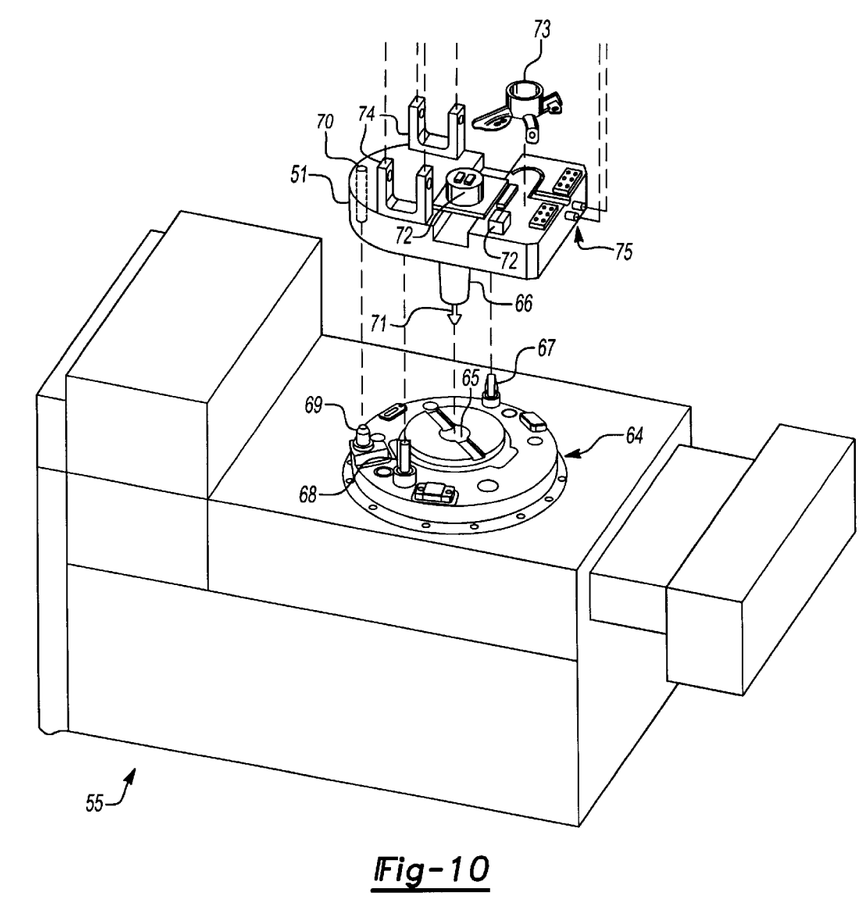
FIG. 10 is a partially exploded, perspective view of a fixture holder of a CNC machine and a fixture and workpiece.

Fixture table 55 is shown in greater detail in FIG. 10. Table 55 can be based on a conventional table such as a Nikken NC. Depending upon the desired machining operations, table 55 can comprise a four-axis or five axis mechanized table. This conventional aspect of table 55 will not be described in detail.

In a preferred embodiment of the present invention, table 55 is specially adapted to receive fixtures vertically. Table 55 may also automatically secure the fixtures using a quick connect/disconnect mechanism as shown in FIG. 10 and more specifically described in co-pending U.S. application Ser. No. 10/060,703, which is hereby incorporated by reference.

Table 55 includes a fixture holder 64 having a central taper socket 65 for receiving a taper shank 66 projecting from the bottom of fixture 51. The taper of socket 65 and shank 66 guide fixture Si into position as fixture 51 is lowered by the gantry arm. As shank 66 enters socket 65, rough alignment pins 67 and 68 approach and enter matching holes in fixture 51 (not shown), and then fine alignment pin 69 approaches and enters fine alignment hole 70 in fixture 51 to accurately position fixture 51 on table 55. Fixture 51 is held in place by a drawbar actuated clamp mechanism (not shown) inside table 55 which locks onto locking tip 71.

A workpiece 73, such as a steering knuckle being machined, is held to fixture 51 by mechanical clamps 72. A pair of U-bars 74 are provided on fixture 51 for grasping by the gantry end-of-arm clamps. Fixture 51 also includes a set of fittings 75 which may include electrical fittings or pneumatic fittings for receiving electric power or compressed air for various robotic functions that might be performed within fixture 51. Connection to and disconnection from fittings 75 can be done in any known manner.

Figure 11:
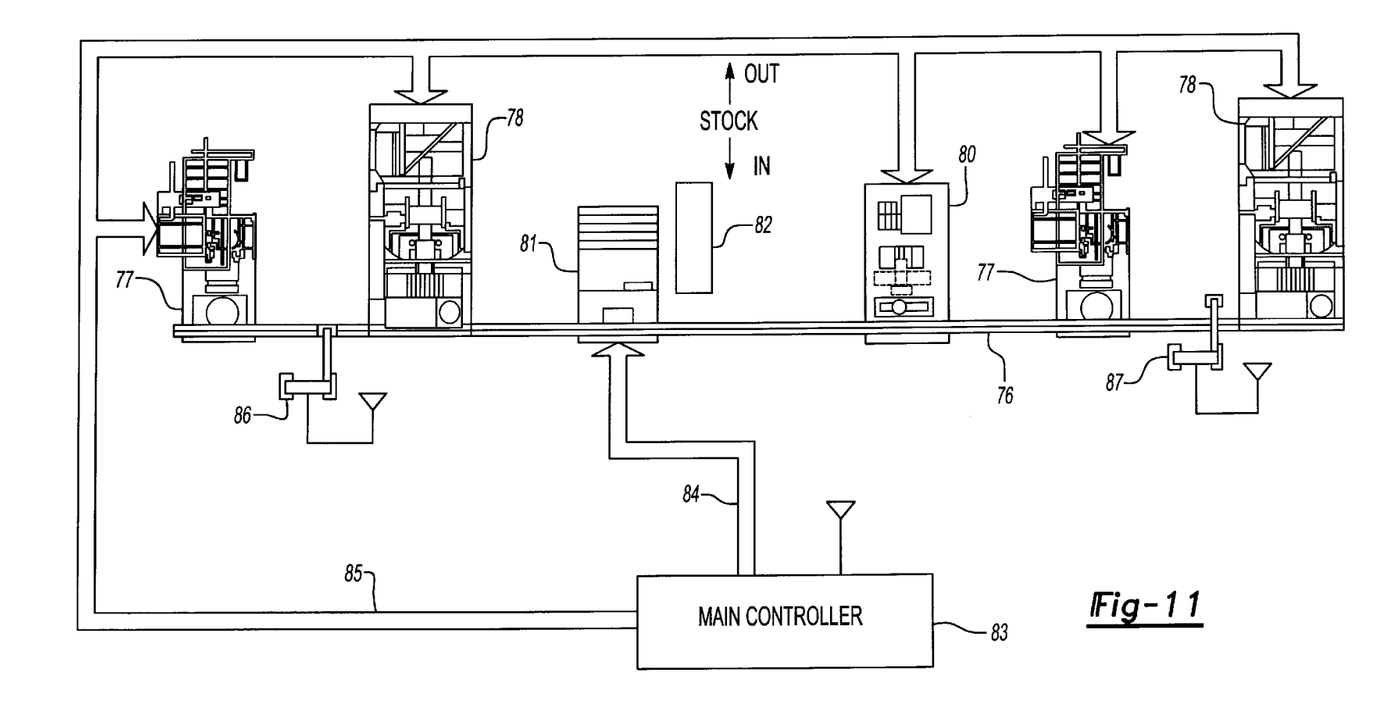
FIG. 11 is an aerial layout view of a manufacturing line according to the present invention and using a monorail line.

Overall system operation of the present invention, including coordination by a main controller, will now be discussed together with an alternative embodiment shown in FIG. 11.

A monorail line 76 is supported overhead in a straight line proximate to a series of machining stations including turret cells 77, CNC machines 78, and a dedicated machining station 80. Dedicated machining station 80 lacks computer numeric control and is constructed to perform a specific set of machining operations only.

An operator station 81 is proximate monorail line 76 for loading and unloading workpieces onto fixtures as in the previous embodiment.

A main controller 83 is coupled to operator station 81 by a communication bus 84 and to each of the machining stations by a communication bus 85. Carriages 86 and 87 and main controller 83 each include respective radio-frequency transceivers for establishing an RF communication link using technology well known in the art. Main controller 83 can be any commercially available control system.

Main controller 83 coordinates machining operations and overall functioning of each element of the manufacturing system. Major functions within the control strategy include 1) registering each workpiece type, 2) determining the appropriate manufacturing steps to be performed for the workpieces, 3) commanding and coordinating carriages as they deliver workpieces from point to point, 4) monitoring current location and in-process progress of the workpieces, and 5) commanding machining stations to perform the appropriate tasks for workpieces being delivered to them.

Figure 12:
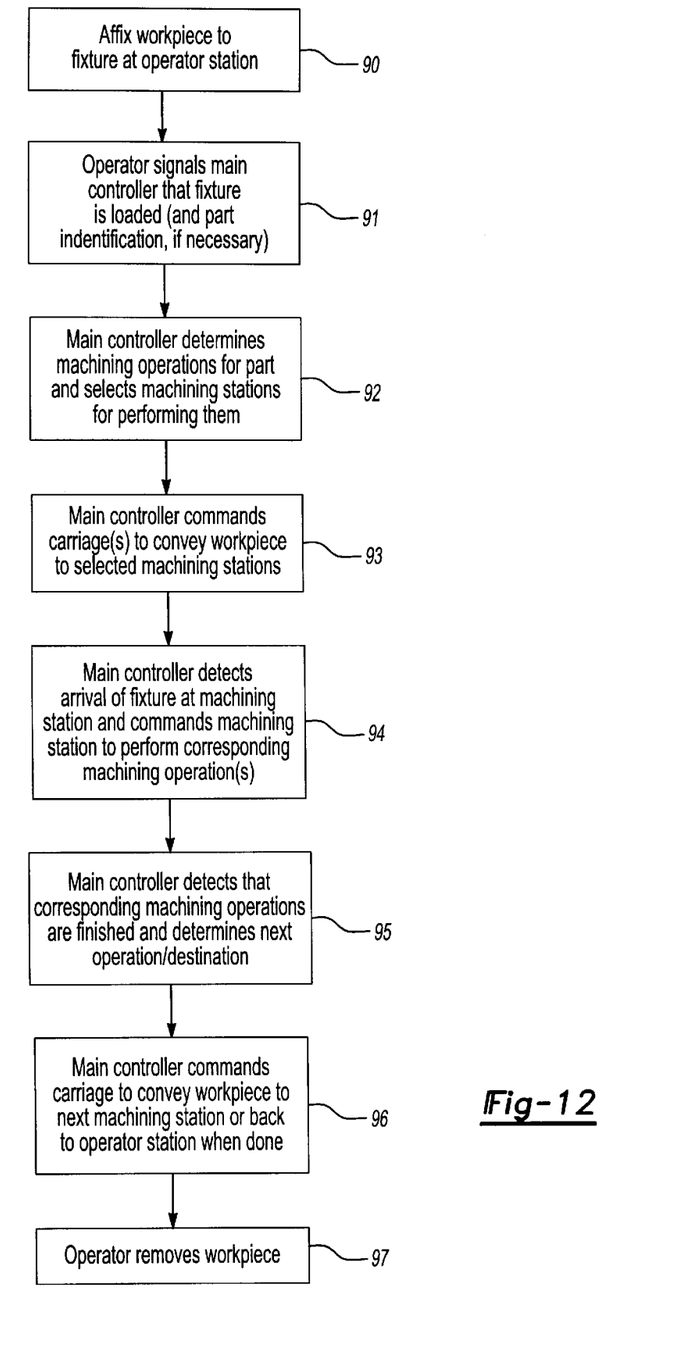
FIG. 12 is a flowchart of a preferred method for performing a sequence of machining operations on a workpiece.

More specifically, a preferred method of the invention is shown in FIG. 12. In step 90, an operator affixes a workpiece to a fixture at the operator station. In step 91, the operator activates a pushbutton or keypad on a control panel at the operator station to send a signal to the main controller to signify that a part is loaded on the fixture and is ready for the machining operations. If the manufacturing line is set up to have the ability to produce more than one specific finished part, then the operator might also generate a signal identifying which kind of workpiece and finished part are desired. Alternatively, the fixture may have automatic means for identifying the type of workpiece and then that information may be transmitted by the carriage to the main controller using the RF communication link.

In step 92, the main controller determines what machining operations to be applied to the workpiece to produce the finished part. It also determines which machining stations should be used and in what sequence to achieve the desired machining of the workpiece. The sequence of machining operations and the stations utilized may be a static, predetermined sequence. Alternatively, if the finished part is capable of being machined using various orders of operations and/or if there are more than one machining stations that could perform certain of the operations, then the main controller may also use an optimization strategy to determine a sequence for any particular workpiece on the fly.

Once the sequence of operations and stations is determined, the main controller commands the carriages to convey the workpiece to the selected machining stations in step 93. In step 94, the main controller detects the arrival of the fixture at a selected machining station and then commands the machining station to perform its corresponding machining operations. The machining station is preferably preprogrammed with each of the steps necessary to accomplish its assigned machining operations (e.g., grasping the fixture, moving the fixture table to present the workpiece to a tool, changing the tool if necessary, operating the tool, moving the table into an unloading position, and releasing the fixture once it is recovered by the carriage arm).

In step 9S, the main controller detects that the machining operations to be performed at one machining station for a particular workpiece are finished (e.g., in response to a completion signal from the machining station) and determines the next machining station and corresponding machining operations that need to be performed on the particular workpiece. In step 96, the main controller commands a carriage to pick up and convey the workpiece to the next machining station, or if the machining operations are completed then back to the operator station. When the workpiece is returned to the operation station, it is removed by the operator in step 97. The operator returns the finished part to the inventory handling system and obtains a new unfinished workpiece for loading onto the fixture just vacated by the finished part.

Figure 13:
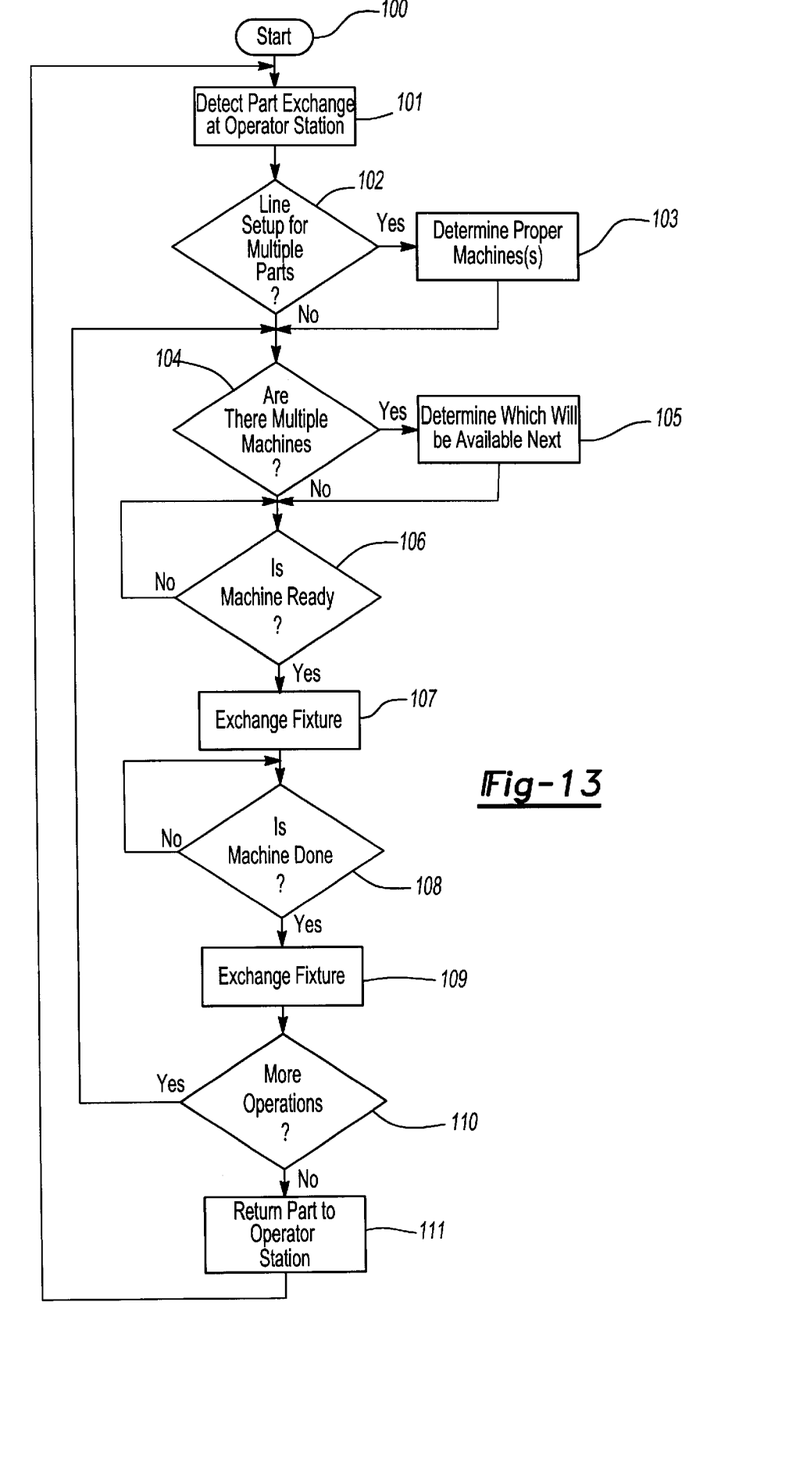
FIG. 13 is a flowchart showing decisions made by a main controller of the present invention.

The decision-making process used in the main controller corresponding to the progress of one particular fixture is shown in greater detail in FIG. 13. After starting at step 100, the main controller detects that a part exchange has occurred at the operator station in step 101. In step 102, the main controller checks whether the particular manufacturing line or loop has been set up to handle multiple parts of different designs. If yes, then the proper machines for processing this particular part are determined in step 103.

In step 104, the main controller checks whether there are multiple machines in the manufacturing line or loop that can be used for the processing of the particular part. If more than one are available, then a check is made in step 105 to determine which machine will be available next (i.e., first). In step 106, a check is made to determine whether the identified machine is ready to accept the fixture with the current part. If not, then the identified machine is rechecked until it is ready.

Once the identified machine is ready, the fixture is exchanged with (i.e., loaded onto) the machine in step 107 and then machining can begin. In step 108, the main controller checks to determine whether the machine is done with the part, and it continues to recheck until it determines that the part is done. Then the fixture is exchanged (i.e., removed) in step 109.

In step 110, the main controller determined whether more machining operations are needed for the particular part. If there are more operations to be done, then a return is made to step 104 to decide if more than one machine is available for the next processing operation. Otherwise, the part is returned to the operator station in step 111 and the process returns to step 101 for tracking the next part loaded onto the fixture at the operator station.

What is claimed is:

1. Apparatus for applying a series of machining operations to a workpiece, comprising:
   an operator station for affixing workpieces to respective fixtures, said fixtures registering and retaining said workpieces during said series of machining operations;
   at least two machining stations, each machining station configured to receive said fixtures and performing respective machining operations, said at least two machining stations include top-entry openings for receiving said fixtures in a generally vertical direction with respect to said at least two machining stations;
   a gantry system mounted above said at least two machining stations and including a plurality of movable carriages running proximate to said at least two machining stations and said operator station, said gantry system receiving said fixtures for conveyance between and among said operator station and said at least two machining stations; and
   a main controller communicating with said operator station, said at least two machining stations, and said gantry system, said main controller monitoring status of said workpiece and being programmed with a sequence for applying predetermined ones of said machining operations to said workpiece, said main controller commanding said gantry system to convey said fixture to said at least two machining stations, commanding said at least two machining stations to perform a selected one of said machining operations, and commanding said gantry system to return said fixture to said operator station;
   wherein each of said fixtures has a predetermined fixture design for carrying said workpieces and each of said at least two machining stations has a corresponding fixture-holder design so that said workpieces remain affixed to the same fixture during said machining operations at said at least two machining stations;
   wherein at least one of said carriages has at least two arms, each arm having a clamp for releasably grasping one of said fixtures, whereby a first fixture having a first workpiece is removed from a first machining station of said at least two machining stations by one of said arms after said first workpiece has been machined at said first machining station and then a second fixture having a second workpiece is inserted in said first machining station by another one of said arms for machining at said first machining station without substantially relocating said carriage; and
   wherein said carriages include servo-mechanisms to control three-dimensional movement of said arms.

2. The apparatus of claim 1 wherein said gantry system includes a monorail loop on which said carriages move.

3. The apparatus of claim 1 wherein said gantry system includes two monorail loops, each loop servicing said operator station.

4. The apparatus of claim 1 wherein said gantry system includes a monorail line on which said carriages move.

5. The apparatus of claim 1 wherein said at least two machining stations include computer-numerically-controlled (CNC) stations.

6. The apparatus of claim 5 wherein said CNC stations include turret cells.

7. The apparatus of claim 1 wherein said at least two machining stations are dedicated machining stations.

8. The apparatus of claim 1 wherein said main controller communicates with each of said carriages by a radio-frequency link.

9. The apparatus of claim 1 wherein said main controller:
   determines an appropriate set of machining operations for a particular workpiece affixed to a fixture at said operator station in response to signals from said operator station;
   commands appropriate ones of said carriages to convey said particular workpiece to said at least two machining stations;
   commands said at least two machining stations to perform said appropriate set of machining operations; and
   commands a carriage to return said particular workpiece to said operator station after said appropriate set of machining operations have been completed.

10. A method of machining workpieces using at least two machining stations and an operator station interconnected by a gantry system mounted above said at least two machining stations, said machining stations, operator station, and gantry system being coupled to a main controller, said method comprising the steps of:

affixing at least two workpieces to respective fixtures;

capturing said fixtures by said gantry system at said operator station;

determining an appropriate set of machining operations for said at least workpieces;

performing said appropriate set of machining operations;

commanding carriages in said gantry system to convey said at least two workpieces to said at least two machining stations, said at least two machining stations include top-entry openings for receiving said fixtures in a generally vertical direction with respect to said at least two machining stations;

commanding said at least two machining stations to perform said appropriate set of machining operations on said at least two workpieces; and commanding a carriage to return said at least two workpieces to said operator station after said appropriate set of machining operations have been completed;

wherein said fixtures have a predetermined fixture design for carrying said at least two workpieces and each of said at least two machining stations has a corresponding fixture-holder design so that said at least two workpieces remain affixed to the same fixture during said machining operations at said at least two machining stations;

wherein at least one of said carriages has at least two arms, each arm having a clamp for releasably grasping one of said fixtures whereby a first fixture having a first workpiece is removed from a first machining station of said at least two machining stations by one of said arms after said first workpiece has been machined at said first machining station and then a second fixture having a second workpiece is inserted in said first machining station by another one of said arms for machining at said first machining station without substantially relocating said carriage; and wherein said carriages include servo-mechanisms to control three-dimensional movement of said arms.

11. The method of claim 10 further comprising the step of:

removing said at least two workpieces from said fixtures after being returned to said operator station.

* * * * *